United States Patent [19]

Smith

[11] Patent Number: 5,039,415
[45] Date of Patent: Aug. 13, 1991

[54] DECONTAMINATION OF HYDROCARBON CONTAMINATED SOIL

[76] Inventor: Alvin J. Smith, 4379 Modoc Rd., Santa Barbara, Calif. 93110

[21] Appl. No.: 512,474

[22] Filed: Apr. 23, 1990

[51] Int. Cl.$^5$ ............................................. C02F 3/34
[52] U.S. Cl. .................................... 210/611; 210/631; 210/747; 405/128; 134/40
[58] Field of Search ............... 210/610, 611, 631, 639, 210/747, 178, 620; 134/40; 435/262, 264; 405/128

[56] References Cited

U.S. PATENT DOCUMENTS

| | | | |
|---|---|---|---|
| 3,951,804 | 4/1976 | Smith | 210/170 |
| 4,021,348 | 5/1977 | Smith | 210/208 |
| 4,039,451 | 8/1977 | Smith | 210/170 |
| 4,179,375 | 12/1979 | Smith | 210/197 |
| 4,336,136 | 6/1982 | Giguére | 210/178 |
| 4,482,459 | 11/1984 | Shiver | 210/639 |
| 4,611,951 | 9/1986 | Sapp | 210/747 |
| 4,822,490 | 4/1989 | Dyadechko et al. | 210/611 |
| 4,849,360 | 7/1989 | Norris et al. | 210/747 |

*Primary Examiner*—Tom Wyse
*Attorney, Agent, or Firm*—William W. Haefliger

[57] ABSTRACT

The method of treating hydrocarbon contaminated soil that includes forming the soil into a flowing particulate stream; forming an aqueous liquid mixture of water and treating substance that reacts with hydrocarbon to form $CO_2$ and water; dispersing the liquid mixture into the particulate soil stream to wet the particulate; allowing the substance to react with the wetted soil particulate to thereby form $CO_2$ and water, whereby the resultant soil is beneficially treated.

9 Claims, 2 Drawing Sheets

DECONTAMINATION OF HYDROCARBON CONTAMINATED SOIL

BACKGROUND OF THE INVENTION

This invention relates generally to clean up of hydrocarbon polluted soil, and more particularly to dispersing of microbes into hydrocarbon pollutant-containing soil to reduce pollutant levels.

Hydrocarbon pollution occurs in many ways, and areas, among which are the following:

1) spillage into the ground as at gasoline service stations (i.e., from rusted tanks, etc.);
2) leakage into the ground, i.e., formation, at or near oil wells; and
3) spillage into the ocean as from oil tanks or oil tankers, and also from bilge pumped into the sea.

Cleanup of such hydrocarbon pollutants is difficult, time consuming and expensive. While microbes have been employed to consume hydrocarbons, it is difficult to deploy the microbes, accurately and in sufficient quantity into polluted in situ soil.

SUMMARY OF THE INVENTION

It is a major object of the invention to provide method and apparatus whereby microbes can be easily and accurately deployed or dispersed into soil, to consume hydrocarbons, the end products of such consumption being carbon dioxide and water. After such removal of the hydrocarbons, the remaining microbes then expire due to lack of "food".

More specifically, the method of controlling contamination at a zone of contamination concentration includes:

a) forming the soil into a flowing particulate stream,
b) forming an aqueous liquid mixture of water and treating substance that reacts with hydrocarbon to form $CO_2$ and water,
c) dispersing the liquid mixture into the particulate soil stream to wet the particulate, and,
d) allowing the substance to react with the wetted soil particulate to thereby for $CO_2$ and water, whereby the resultant soil is beneficially treated.

As will appear, the treating substance typically includes bacteria characterized as reacting with or consuming the hydrocarbon to produce $CO_2$ and water. Natural occurring bacteria are preferred. Also, the treated soil particulate may be oxygenated to aid in consumption of the hydrocarbon to return the soil to unpolluted, natural state. The soil typically originates underground, where it has been hydrocarbon contaminated in situ, and such soil is removed (creating a void) for subjecting it to the forming step; also, treated soil may be filled into the void.

It is another object of the invention to provide such method wherein the forming step includes impacting the soil to reduce it to particles less than about ⅜ inches in cross dimension; and the forming step may include conveying the stream through a wetting zone, and dispersing the mixture into the stream at that zone.

A further object includes providing a method wherein the dispersing step includes spraying the liquid mixture into the stream. The wetted soil particles may then be discharged off the conveyor and into the air to aerate and fall, for collection.

Further objects include storing the wetted soil particles at controlled depth, and recycling the stored soil for further aeration and wetting.

These and other objects and advantages of the invention, as well as the details of an illustrative embodiment, will be more fully understood from the following specification and drawings, in which:

DRAWING DESCRIPTION

DETAILED DESCRIPTION

Figure 1:
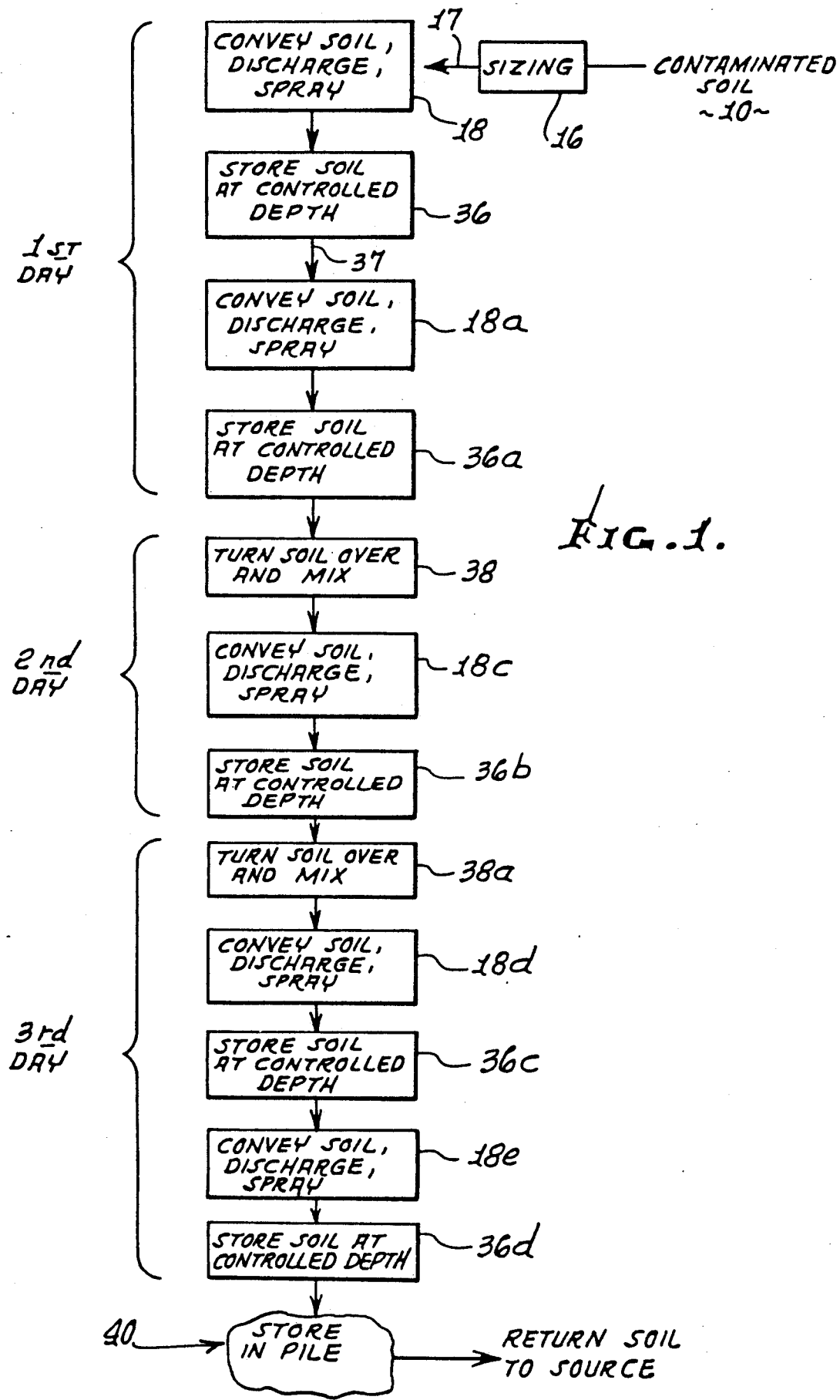
FIG. 1 is a flow diagram.
Figure 2:
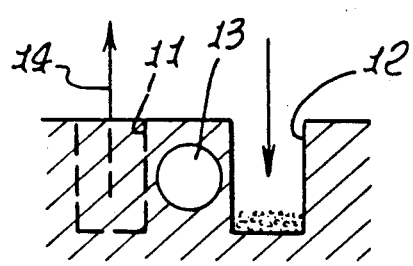
FIG. 2 is an elevation showing contaminated soil excavation, and decontaminated soil return to an excavation void.
Figure 4:
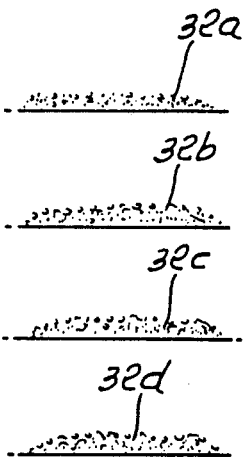
FIG. 4 is an end elevation taken on lines 4—4 of FIG. 3.
Figure 4:
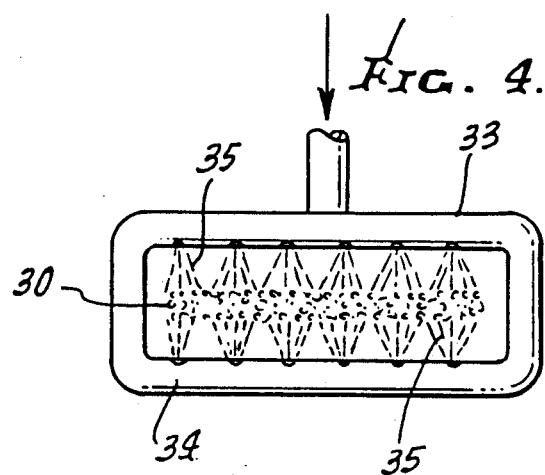

Referring first to FIG. 1, contaminated soil is supplied at 10, as for example from an excavated zones 11 and 12 seen in FIG. 2. Those zones may extend about an underground storage tank 13 from which hydrocarbon (gasoline, diesel fuel, and solvents, etc.) has leaked; or they may lie underneath a surface area into which hydrocarbon spill and seep downward. These are examples only, the important step being excavating or removing the soil, as at 14 for treatment, as in FIG. 1.

In FIG. 1, the contaminated soil is first sized to form small pieces, i.e., to reduce clods to particles less than about ⅜ inches in cross dimension. This sizing step appears at 16. The stream of particles 17 is then passed to a conveyor where the particles are conveyed to selected elevation, and then discharged at an upward angle, providing a free dwell path before the particles then fall to the ground. While the particles are so traveled, as in their free dwell path, they are sprayed with microbe-containing solution. This first conveying, discharging and spraying step is indicated at 18 in FIG. 1.

Figure 3:
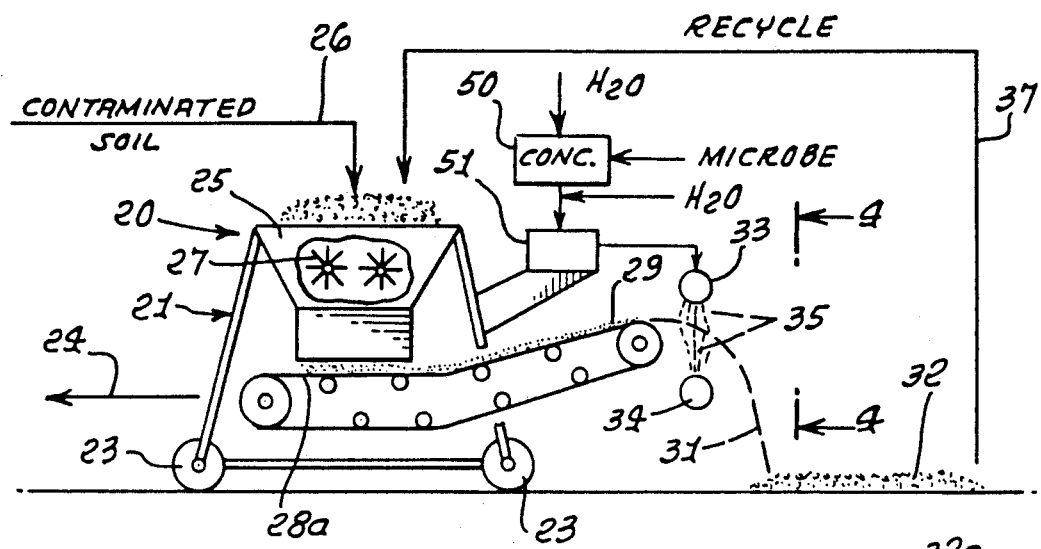
FIG. 3 is a side elevation showing equipment treatment of contaminated soil.

An example of equipment to perform step 18 is shown schematically at 20 in FIG. 3. A carrier 21, such as a transport vehicle, has a frame 22 supported on wheels 23, and travels in the direction indicated by arrow 24. A hopper 25 on the carrier frame receives the contaminated soil as at 26. Beaters 27 in the hopper rotate and reduce soil clods to sized particles, as referred to above. Those particles gravitate downwardly to and into the lower extent of the hopper and fall onto the upper stretch 28a of the endless conveyor. Stretch 28a travels rightwardly and also upwardly to discharge a stream 29 of soil particles (under about ⅜ inch in cross dimension) rightwardly and upwardly to travel along a dwell path 30 and then fall at 31 to the ground in a layer 32. Spray ducts 33 and 34 above and below the stream 29 serve to spray the particles, as they aerate and fall, with microbe-containing aqueous solution or dispersion 35. The carrier 21 travels at a rate so related to the rate of particles discharged that the depth of the layer 32 of wetted particles is controlled to be less than about 1½ feet, allowing some air to circulate into the mass of particles as they lie in layer 32. This storage step, in layer 32, also allows aqueous solution penetration into and saturation of the wetted particles for microbial consumption of the hydrocarbons in the soil. Such microbes are preferably those which can be formed in soil but are concentrated in the solution. The reaction can be considered as follows:

$H_xC_y + \text{microbes} \rightarrow CO_2 + H_2O$ where x and y are numbers defining the contaminant hydrocarbon in the soil.

The storage step in layer 32 is indicated at 36 in FIG. 1. Following that step, the soil is again passed through the equipment shown in FIG. 3, i.e., broken up, at 27, conveyed at 29, discharged at 30, and wetted at 35, this step indicated at 18a. Recycle of the soil is shown at 37 in FIGS. 1 and 3. The soil is allowed to lie in layer 32 between about 4 to 10 hours prior to recycle at 37. Water evaporates from the soil during this time.

After step 18a, the soil is allowed to lie in a second wetted and aerated layer 32a for about 10-20 hours during which time water evaporates. See step 36a in FIG. 1. All of steps 18-36a may be carried out during one 24 hour period, i.e., a "first day".

The soil in layer 32a is then turned over, i.e., mixed, on the ground (see step 38 in FIG. 1), after which it is again passed through the FIG. 3 equipment. See step 18c in FIG. 1. The subsequent step of allowing the soil to lie in a third wetted and aerated layer 32b (FIG. 3) is indicated at 36b in FIG. 1. The soil is allowed to be in layer 32c for between 15 and 24 hours. All of steps 38, 18c and 36b may be carried out during a "second day".

The soil in layer 32b is then turned over and mixed on the ground (see step 38a in FIG. 1), after which it is again passed through the FIG. 3 equipment. See step 18d in FIG. 1. The subsequent step of allowing the soil to be in a fourth wetted and aerated layer 32c (FIG. 3) is indicated at 36c in FIG. 1. After 7-10 hours in layer 32c, the soil is again passed through the FIG. 3 equipment, see step 18e and stored in a layer, see Step 36d. Steps 38a-36d may be carried out during a "third day".

The layers 32, 32a, 32b, 32c, and 32d are each typically no greater then about 18 inches in height (thickness) to allow aeration thereof.

After after about 15-24 hours in layer 32d, the treated (decontamined) soil is formed on a pile as at 40 in FIG. 1, and then may be reused, as for example returned to the void 11 or 12 from which it was removed (see FIG. 2), or to some other excavation void or area of reuse.

The solution sprayed on the soil, as at 30 and 35, consists of a concentrate of naturally occurring microbes (aerobic and/or anaerobic) in water. The solution is prepared by soaking bacteria-containing particles (for example the product known as "WASTE 60" produced by Janco, Inc., St. Louis, Missouri) in water for 1-10 hours to form the concentrate. See 50 in FIG. 3. For example about 120 grams of such particles is soaked in 15 gallons of water. That concentrate is then diluted (100 to 3,500 parts of concentrate to 1,000,000 parts of water) to form the solution (see 51 in FIG. 3) that is sprayed. Preferably about 3000 ppm is used.

The microbes employed consist of one or more of the following:
achromobacter
arthrobacter
aspergillus
bacillus
candida
cladosporium
corynebacterium
myrothecium
punicillium
phialophora
pseudomonas
rhodothorula
streptomyces
trichoderma
a blend of anaerobic and facultative organisms.

I claim:

1. The method of treating hydrocarbon contaminated soil that includes:
   a) forming the soil into a flowing particulate stream,
   b) forming an aqueous liquid mixture of water and treating substance that reacts with hydrocarbon to form $CO_2$ and water,
   c) dispersing said liquid mixture into the particulate soil stream to wet the particulate,
   d) allowing said substance to react with the wetted soil particulate to thereby form $CO_2$ and water, thereby the resultant soil is beneficially treated,
   e) said stream being freely projected to dwell at a level and then fall, and said dispersing includes spraying the liquid mixture into the projected stream at said dwell,
   f) said substance consisting of natural bacteria, and at a concentration level in the mixture of between 100 to 3,000 PPM of bacteria to water,
   g) said soil forming step including impacting the soil to reduce it to particles less than about ⅜ inches in cross dimension,
   h) and including forming the wetting particulate into a first layer on a surface to allow said substance to react.

2. The method of claim 1 wherein said soil originates underground, where it has been hydrocarbon contaminated in situ, including removing the in situ soil for subjecting it to said forming step.

3. The method of claim 1 including agitating the soil particles in said layer.

4. The method of claim 1 including providing a moving conveyor surface, and supporting the soil particles on said conveyor surface to be projected to dwell.

5. The method of claim 4 including discharging the wetted soil particles off the conveyor and into the air to aerate and fall, for collection.

6. The method of claim 1 wherein the bacteria are selected from the group consisting of
achromobacter
arthrobacter
aspergillus
bacillus
candida
cladosporium
corynebacterium
myrothecium
nocardia
punicillium
phialophora
pseudomonas
rhodothorula
streptomyces
trichoderma
a blend of anaerobic and facultative organisms.

7. The method of claim 1 wherein, after several hours, said first layer is mixed to form a stream of particulate, and the steps of sub-paragraph e) of claim 1 are repeated to form a second layer.

8. The method of claim 7 wherein after several hours the second layer is mixed to form a stream of particulate, and the steps of sub-paragraph e) of claim 1 are repeated using the second layer to form a third layer.

9. The method of treating hydrocarbon contaminated soil that includes:

a) forming the soil into a flowing particulate stream;
b) forming an aqueous liquid mixture of water and treating substance that reacts with hydrocarbon to form $CO_2$ and water,
c) dispersing said liquid mixture into the particulate soil stream to wet the particulate,
d) allowing said substance to react with the wetted soil particulate to thereby form $CO_2$ and water, whereby the resultant soil is beneficially treated,
e) said stream being freely projected to fall, and said dispersing includes spraying the liquid mixture into the projected stream,
f) said substance consisting of natural bacteria, and at a concentration level in the mixture of between 100 to 3,000 PPM of bacteria to water,
g) said soil forming step including impacting the soil to reduce it to particles less than about ⅜ inches in cross dimension,
h) and including forming the wetting particulate into a first layer on a surface to allow said substance to react.

* * * * *